US012736135B2

(12) United States Patent
Santo

(10) Patent No.: US 12,736,135 B2
(45) Date of Patent: Sep. 15, 2026

(54) SEALING SYSTEM FOR A ROTARY SHAFT WITH RADIALLY DIRECTED SEALING FORCES

(71) Applicant: Tamar (R.C.) Technologies Development Ltd., Omer (IL)

(72) Inventor: Nir Santo, Beer Sheva (IL)

(73) Assignee: Tamar (R.C.) Technologies Development Ltd., Omer (IL)

( * ) Notice: Subject to any disclaimer, the term of this patent is extended or adjusted under 35 U.S.C. 154(b) by 0 days.

(21) Appl. No.: 18/899,339

(22) Filed: Sep. 27, 2024

(65) Prior Publication Data

US 2025/0102064 A1 Mar. 27, 2025

Related U.S. Application Data

(60) Provisional application No. 63/540,705, filed on Sep. 27, 2023.

(51) Int. Cl.
*F16J 15/18* (2006.01)

(52) U.S. Cl.
CPC .................................... *F16J 15/18* (2013.01)

(58) Field of Classification Search
CPC .................................. F16J 15/20; F16J 15/18
See application file for complete search history.

(56) References Cited

U.S. PATENT DOCUMENTS 4,384,726 A * 5/1983 Meyer ...................... F16J 15/20 277/516
4,709,758 A * 12/1987 Preston, Jr. ......... E21B 33/1208 166/120
5,114,160 A * 5/1992 Ootsuka ............... F16J 15/3404 277/408
5,792,525 A * 8/1998 Fuhr ...................... B32B 33/00 277/654
7,931,125 B2 4/2011 Downes et al.
2005/0098960 A1* 5/2005 Heinfried ............... F16J 15/186 277/510
2021/0246983 A1 8/2021 Cohen-Zada
2023/0175592 A1 6/2023 Cohen-Zada et al.

FOREIGN PATENT DOCUMENTS

JP 63075394 5/1988
JP 07000791 A * 1/1995
WO WO-2007099535 A2 * 9/2007 ............. F16J 15/181
WO WO-2009098684 A2 * 8/2009 ............. F01C 19/10

OTHER PUBLICATIONS

Extended European Search Report—EP24203018—Application No. 24203018.7-1015—Feb. 13, 2025.

* cited by examiner

*Primary Examiner* — Eugene G Byrd
(74) *Attorney, Agent, or Firm* — Sand, Sebolt & Wernow Co., LPA

(57) ABSTRACT

A seal for a rotary shaft comprising having a stuffing box at least partially filled with a sealant material. At least one sealing ring bounds the stuffing box. Pressure applied to the sealant material in the stuffing box is transferred to at least one sealing ring in a radially inward direction.

8 Claims, 2 Drawing Sheets

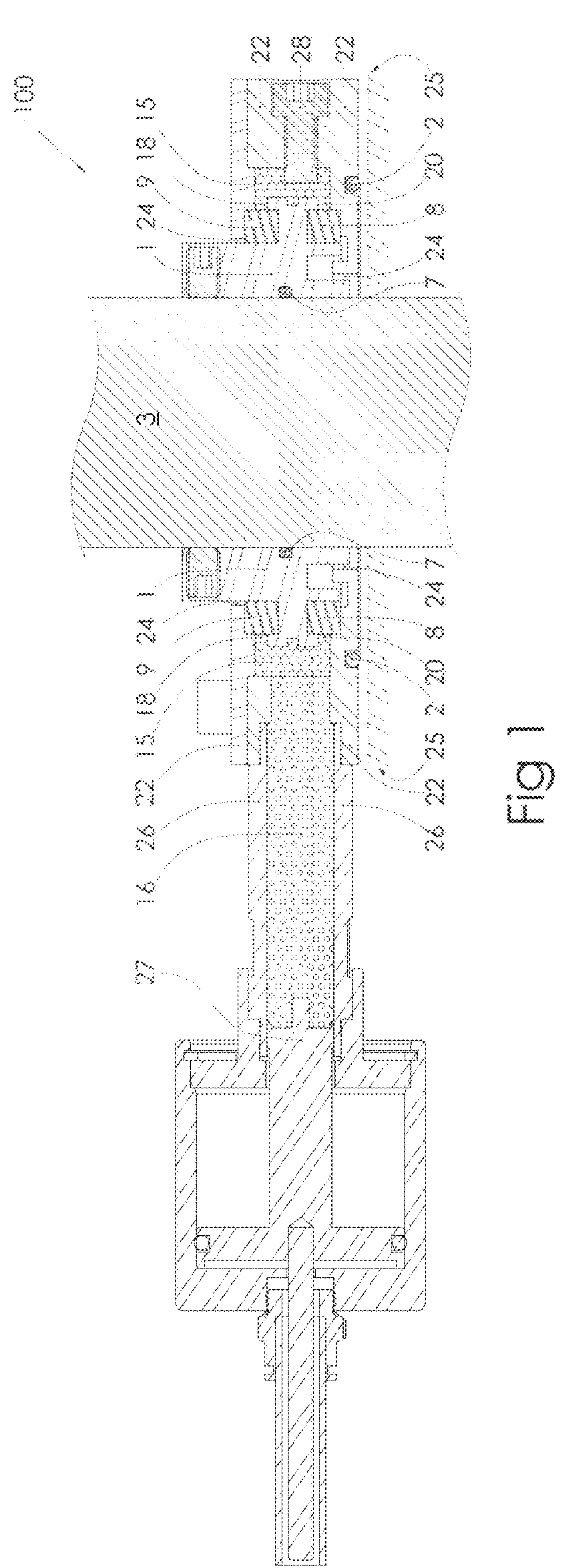
100
22
28
22
25
15
18
9
24
1
2
20
8
24
7
3
1
24
9
18
15
22
26
16
7
24
8
20
2
25
22
26
27
Fig 1
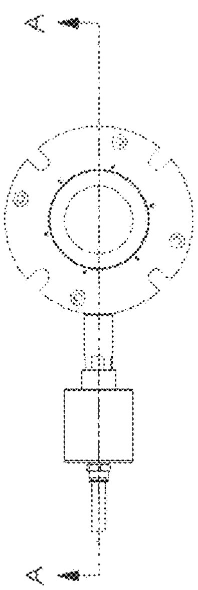
A
A

SEALING SYSTEM FOR A ROTARY SHAFT WITH RADIALLY DIRECTED SEALING FORCES

REFERENCE TO RELATED APPLICATIONS

This application claims the benefit of U.S. Provisional Application Ser. No. 63/540,705, filed on Sep. 27, 2023; the disclosure of which is incorporated herein by reference.

FIELD OF THE INVENTION

The present invention relates to seals for a rotating shaft.

BACKGROUND OF THE INVENTION

Many types of machines utilize a rotating shaft that acts on a substance referred to as the "working fluid". When it is necessary to prevent escape of the working fluid from its container, a seal is necessary at the location where the shaft enters the container.

A typical seal for a rotary shaft has a sleeve is attached to the shaft that rotates with the shaft. Surrounding the shaft is a stationary housing. Several O-rings are provided that prevent seepage of the working fluid though then arrow gap between the shaft and the sleeve, and between the seal and the container.

In some rotary shaft seals, between the shaft and the housing is an annular space known as the "stuffing box". The stuffing box is filled with a lubricating sealant material, hereinafter referred as the "sealant". A pair of separated sealing rings, bound the stuffing box to prevent escape of the sealant from the stuffing box, and to prevent seepage of the working fluid into the stuffing box.

The sealant may be injected into the stuffing box by means of an injector. It is desirable to maintain the sealant at an elevated pressure in order to enhance the sealing and lubricating effects of the sealant. US Patent Publication 2023/0175592A1 discloses a rotary shaft seal in which the pressure on the sealant is transferred to each of the sealing rings in a direction that is parallel to the rotational axis of the shaft. A similar arrangement in which the pressure on the sealant is transferred to the sealing rings in a direction parallel to the rotational axis of the shaft, is also described in US Patent Publication 20210246983

SUMMARY OF THE INVENTION

The present invention provides a seal for a rotary shaft. The seal is configured to surround a segment of a rotary shaft that extends beyond a first side of the seal into a working fluid. On the second side of the seal, the shaft is attached to a motor generating rotation of the shaft. The seal serves to prevent or minimize escape of the working fluid from its container during rotation of the shaft.

The seal has a sleeve surrounding the shaft that rotates with the shaft. The sleeve is surrounded by a stationary housing. A lubricating sealant material, herein referred to as the "sealant", fills a stuffing box between the sleeve and the housing. A pair of sealing rings prevent or minimize loss of the lubricant material from the annular space.

An injection tube is filed with sealant material that is maintained under pressure. The pressure of the sealant is transferred to the sealant in the stuffing box, which, in turn, is transferred to the sealing rings in a radially inward direction. The inventors have found that by applying radially inward pressure on the sealing rings, as opposed to parallel to the rotational axis of the shaft, can improve the quality of the seal provided by the sealing rings, and allows for a more compact structure in the longitudinal direction.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 1 shows a seal for a rotating shaft in longitudinal section in accordance with one embodiment of the invention.

DESCRIPTION OF THE INVENTION

Figure 2:
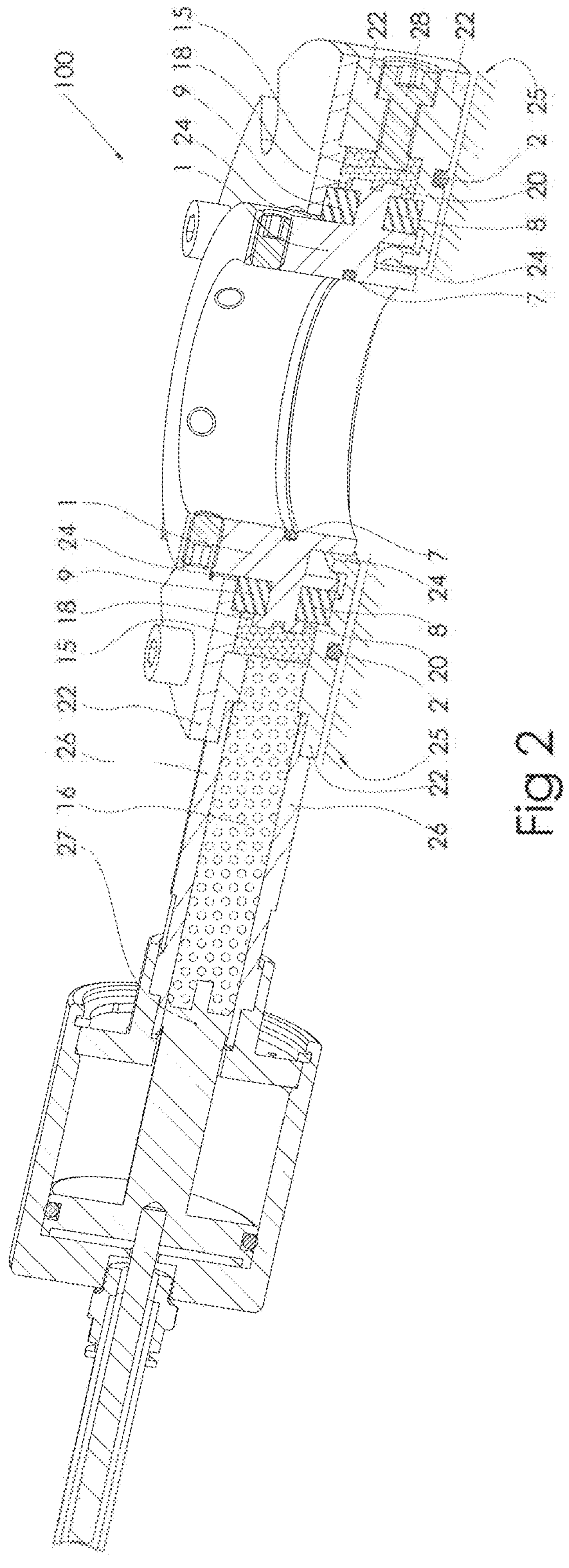
FIG. 2 shows the seal of FIG. 1 in a perspective view.

FIG. 1 shows a rotary shaft seal 100 in a longitudinal section in accordance with one embodiment of the invention. The seal 100 is shown in perspective view in FIG. 2. The seal 100 is configured to surround a segment of a rotary shaft 3. Referring to the orientation of the rotary shaft seal 100 in FIG. 1, the rotary shaft 3 extends below the seal 100 into a working fluid (not shown in FIG. 1) that the rotary shaft 3 works on. Above the seal 100, the shaft 3 is attached to a motor (not shown in FIG. 1) generating rotation of the shaft 3. The seal 100 serves to prevent. or minimize passage of the working fluid from escaping the its container. The seal 100 comprises a sleeve 1 that surrounds the rotary shaft 3 and is attached to the shaft 3 so as to rotate with the shaft 3. The sleeve 1 is surrounded by a stationary housing 22. The housing 22 is immobilized by attachment to a surface 25 of the working fluid container.

A sealing ring (also known as an "O-ring") 7 prevents or minimizes passage of the working fluid through a thin gap between the shaft 3 and the sleeve 1. A sealing ring (O-ring) 2 prevents or minimizes passage of the working fluid through a thin gap between the housing 22 and the surface 25 of the working fluid container. The sealing rings 2 and 7 may be made, for example, from FKM, NBR, or FFKM. Fibrous O-rings of braided sealing can also be used.

A sealant and lubricating material fills a stuffing box 15, between the sleeve 1 and the housing 22. The sealant material in the stuffing box is maintained stationary and is prevented from rotating with the shaft 1 by means of one or more screws or pins 28 inserted into the housing 22 and terminating inside the sealant material in the space 15. An example of a suitable sealant material is U-PAK® manufactured by UTEX Industries.

Sealing rings 8 and 9 form a pair of separated seals between the stationary housing 22 and the rotating sleeve 1 and prevent or minimize seepage of the working material in a narrow gap 24 between the housing 22 and the sleeve. 1.

An injection tube 26 located in the housing 22 is configured to be attached to a source of pressure. The injection tube 26 may be configured to be attached, for example, to an injector The injection tube is filed with sealant material 16. The sealant material 16 in the injection tube 26 is maintained under pressure by means of the injector. The pressure of the sealant material 16 is transferred to the sealant in the stuffing box 15. The pressure on the sealant in the stuffing box 15 by the pressurized material 16 in the injection tube 26 is transferred through two annular projections 18 and 20 in the in the stuffing box 15, which in turn apply pressure to the sealing rings 8 and 9, respectively. In this way, pressure is applied to the sealing rings 8 and 9 in an radially inward direction. The inventors have found that by applying radially inward pressure on the sealing rings 8 and 9 improves the quality of the seal by the sealing rings 8 and 9.

The sealing rings 8 and 9 may be immobilized by one more screws (not shown) that are fixed in the housing 22 and that extend into the sealing rings 8 and 9. Alternatively or additionally, the sealing rings 8 and 9 may be immobilized by means of barbs (not shown) extending from the housing 22 into the sealing rings 8 and 9. The inventors have found that the use of stationary rings 8 and 9, instead of rings that are integral with the sleeve and that rotate with the sleeve generates pressure on the sealing rings, an effect referred to as mechanical packing or compression packing, which improves the sealing effect of the sealing rings 8 and 9.

The rotary shaft seal 100 may be provided with an air injection system (not shown) that allows air to be injected into the sealing gap 24. The inventors have found that injecting air into the gap adsorbs and dilutes any gaseous debris in the working fluid that may be generated during rotation of the shaft. The inventors have further found that injecting water into the gap 24 can remove particulate debris that forms in the gap 24 during rotation of the shaft.

What is claimed is:

1. A seal for a rotary shaft comprising:

(a) a sleeve configured to surround the rotary shaft;

(b) a housing surrounding the sleeve;

(c) a stuffing box between the housing and the sleeve, the stuffing box being configured to be at least partially filled with a sealant material; and (d) at least one sealing ring between the housing and the sleeve and bounding the stuffing box;

wherein a pressure applied to the sealant material in the stuffing box is transferred to the at least one sealing ring in a radially inward direction.

2. The rotary shaft seal according to claim 1 further comprising an injection tube configured to apply the pressure to the sealant material in the stuffing box.

3. The rotary shaft seal according to claim 2 wherein the injection tube is configured for attachment to a source of pressure.

4. The rotary shaft seal according to claim 3 wherein the source of pressure is an injector.

5. The rotary shaft seal according to claim 1 further comprising a device for preventing rotation of the sealant material in the stuffing box.

6. The rotary shaft seal according to claim 5 wherein the device for preventing rotation of the sealant material comprises one or more screws or pins configured to terminate in the stuffing box.

7. The rotary shaft seal according to claim 1 wherein at least one of the sealing rings is immobilized by one or more screws or barbs.

8. The rotary shaft seal according to claim 1 further comprising an air injection system configured to inject air into at least a portion of a gap between the housing and the sleeve.

* * * * *